United States Patent [19]

Lee et al.

[11] Patent Number: 5,062,273
[45] Date of Patent: Nov. 5, 1991

[54] METHOD AND APPARATUS FOR REMOVAL OF GAS FROM REFRIGERATION SYSTEM

[75] Inventors: Kung H. Lee, Chadds Ford, Pa.; Earl M. Clark, Newark, Del.

[73] Assignee: E. I. Du Pont de Nemours and Company, Wilmington, Del.

[21] Appl. No.: 551,954

[22] Filed: Jul. 12, 1990

[51] Int. Cl.$^5$ .............................................. F25B 47/00
[52] U.S. Cl. ........................................ 62/85; 62/475
[58] Field of Search ................. 62/475, 85, 195, 292, 62/474, 529; 55/16, 158

[56] References Cited

U.S. PATENT DOCUMENTS

| | | | |
|---|---|---|---|
| 4,304,102 | 12/1981 | Gray | 62/85 |
| 4,316,364 | 4/1982 | Spauschus | 62/129 |
| 4,417,451 | 11/1983 | Spauschus | 62/129 |
| 4,476,688 | 10/1984 | Goddard | 62/149 |
| 4,553,983 | 11/1985 | Baker | 55/16 |

OTHER PUBLICATIONS

"Recovery of Freon Gases with Silicon Rubber Membranes", Daryl L. Roberts et al., Ind. Eng. Chem. Process Des. Dev. (1986) pp. 971-973.
"Membrane Research in Energy and Solvent Recovery from Industrial Effluent Streams", R. W. Baker et al., DOE/ID/12379-T1 (1982-1983) pp. 17-24.

Primary Examiner—Albert J. Makay
Assistant Examiner—John Sollecito
Attorney, Agent, or Firm—Robert B. Stevenson

[57] ABSTRACT

An improved process for separating and removing non-condensible gaseous contaminants (e.g., nitrogen, oxygen and the like) from a conventional halocarbon vapor compression refrigeration system by withdrawing a vapor stream above liquified refrigerant exiting the condenser on the high pressure side of the expansion valve and then processing this vapor by use of a second compression step, followed by condensation into a receiver. The liquid halocarbon from the receiver is returned to the evaporator while the vapor phase is sent to a semipermeable membrane separation unit. The halocarbon enriched effluent from the semipermeable membrane unit is recycled to the inlet side of the second compressor while the non-condensible contaminant enriched stream is vented from the refrigeration system. Such a high pressure purge loop is useful in selectively removing non-condensible gaseous with minimum halocarbon refrigerant loss.

8 Claims, 2 Drawing Sheets

METHOD AND APPARATUS FOR REMOVAL OF GAS FROM REFRIGERATION SYSTEM

BACKGROUND OF THE INVENTION

1. Field of the Invention

The present invention relates to an improved process and apparatus for eliminating non-condensible gas from a halocarbon vapor compression refrigeration system. More specifically, the invention relates to further processing of a vapor stream from over the liquid refrigerant exiting the condenser on the high pressure side of the expansion valve by use of a second compression cycle and semipermeable membrane separation step.

2. Description of the Prior Art

Halocarbon vapor compression refrigeration systems have become necessary and an integral part of modern life. Household refrigerators and freezers, home air conditioners, heat pumps, automobile air conditioners, industrial air conditioners, industrial freezers, as well as in cooling of brine and water in industrial processing all use halocarbon vapor compression refrigeration systems. Such systems use refrigerant fluids such as monochlorotrifluoromethane, trichloromonofluoromethane, dichlorodifluoromethane, monochlorodifluoromethane, trichlorotrifluoroethane, tetrafluoroethane, monochloropentafluoroethane, and mixtures such as those of monochlorodifluoromethane, and monochloropentafluoroethane, and of dichlorodifluoromethane and difluoroethane as circulating refrigerant fluid in a system comprising a compressor, a condenser, a fluid expansion means, and an evaporator. The working fluids are therefore low boiling liquids boiling in the range from about −90° C. to about 50° C. In operation, the circulating fluid is first compressed and then cooled in the condenser, liquifying the fluid and the liquid is then allowed to vaporize in the evaporator thus cooling the environment of the evaporator.

For most domestic applications, the halocarbon vapor refrigeration systems such as refrigerators, freezers, room air conditioners, and the like are systems hermetically sealed at the factory; i.e., sealed systems wherein after evacuation of the system and the refrigerant charge is introduced into the system the whole system is permanently sealed by soldering or brazing. For the most part the evacuation and the sealing of the systems for domestic use are done carefully such that most of the household refrigeration systems are trouble-free for many years.

However in most industrial applications of the refrigeration systems, the evaporation unit, compressor unit, and condenser unit are usually spaced away from each other and therefore the evacuation of the system, the charging of the refrigerant, and the sealing of the system are usually carried out under less than ideal conditions at the location of the industrial system. Under such conditions, less than adequate evacuation and faulty sealing may permit presence of non-condensible air in the refrigeration system. The presence of non-condensible material in the recycling refrigerant composition lowers the efficiency of the refrigeration system and when the non-condensibles are present in sufficient amounts may lead to the failure of the compressor. Aside from the initial occlusion of air in the recirculating refrigerant composition, any leak, particularly in the evaporator and/or low pressure side of the compressor where sub-atmospheric pressure frequently exists during normal operation, will add air to the system. Even when no air is present initially, non-condensible gas may originate from the thermal decomposition of the refrigerant itself as well as from the thermal decomposition of lubricants and stabilizers present in the refrigerant compositions. These thermal decompositions are more likely to occur in a large scale industrial application than in a smaller domestic units due to the considerably more severe operating environment of the industrial units.

In view of these known problems associated with the accumulation of contaminant gases in a vapor compression refrigerant system, certain proposed modifications to the conventional refrigeration cycle have recently been proposed. For example. U.S. Pat. No. 4,316,364 uses an elongated vertical gas accumulating chamber positioned in the high pressure side of the refrigerant circuit along with a temperature indicator to trap non-condensible contaminant gases and measure their temperature. A depressed temperature relative to the temperature of the condensed refrigerant is used as an in-situ indication of the onset of a malfunction. Similarly, in U.S. Pat. No. 4,417,451 the inlet to the elongated vertical gas accumulator chamber is equipped with a perm-selective membrane and a purge valve is used to exhaust unwanted contaminant gases accumulated therein.

SUMMARY OF THE INVENTION

The present invention provides an improved process and related apparatus for separating and removing non-condensible gaseous contaminants from a halocarbon vapor compression refrigeration system. The present invention facilitates the effective purging of non-condensibles by providing a second compressor that compresses a slip stream of the vapor phase found downstream from the condenser prior to the expansion valve of a conventional halocarbon vapor compression refrigeration system. After compressing this vapor phase to a substantially higher pressure, a second purge condenser and purge receiver is employed to further separate and isolate the non-condensible contaminants from liquid halocarbon refrigerant. The liquid refrigerant is returned to the evaporator while the vapor phase containing the non-condensible contaminants is further processed in a semipermeable membrane separator to further enrich the non-condensibles before venting them from the overall refrigeration system.

Thus, the present invention provides in a process wherein a halocarbon refrigerant is circulated, by use of a first compressor, from the high pressure outlet of the first compressor sequentially through a first condenser, a fluid expansion valve and an evaporator and then back to the low pressure inlet side of the compressor, the specific improvement comprising the steps of:

(a) withdrawing at least a portion of the vapor phase present between the high pressure outlet of the first compressor and the high pressure side of the expansion valve means, wherein the vapor phase withdrawn contains non-condensible contaminants;

(b) subjecting the vapor phase containing non-condensible contaminant of step (a) to a second compression to an even higher pressure;

(c) passing the high pressure compressed vapor phase of step (b) through a second condenser to produce a condensed liquid phase halocarbon and a vapor phase enriched in non-condensible contaminant;

(d) separating the liquid phase halocarbon produced in step (c) and returning the liquid phase halocarbon back to the liquid phase halocarbon refrigerant to be passed through an evaporator;

(e) passing the vapor phase enriched in non-condensible contaminant produced in step (c) through a semipermeable membrane means to form a halocarbon enriched/non-condensible contaminant depleted first stream and a non-condensible contaminant enriched/halocarbon depleted second stream;

(f) recycling the halocarbon enriched/non-condensible contaminant depleted first stream produced in step (e) to the inlet side of the second compression step (b); and (g) removing the non-condensible contaminant enriched/halocarbon depleted second stream produced in step (e) from further circulation.

It is an object of the present invention to provide a purge system for a conventional halocarbon vapor compression refrigeration unit that separates and isolates non-condensible gases present in the circulating halocarbon refrigerant. It is an additional object of the present invention to provide a purge system that isolates the non-condensible gases at a concentration level significantly higher than previously known such that periodic exhausting of the accumulated non-condensible gases does not represent a significant loss of refrigerant.

DESCRIPTION OF THE PREFERRED EMBODIMENTS

The improved method and apparatus of removing non-condensible gas from a halocarbon vapor compression refrigeration system according to the present invention, how it differs from previously suggested methods and what advantages there are associated with the use of the improved method relative to those of the prior art can perhaps be best explained and understood by reference to the drawings.

The schematic flow diagrams of the figures illustrate two alternative embodiments for eliminating non-condensible gas from a halocarbon vapor compression refrigeration system. The two alternate specific embodiments differ from each other in that FIG. 1 illustrates a semipermeable membrane which is more permeable to the halocarbon than the gas contaminant and FIG. 2 illustrates a semipermeable membrane which is more permeable to the gas contaminant than the halocarbon (as described more fully later).

Figure 1:
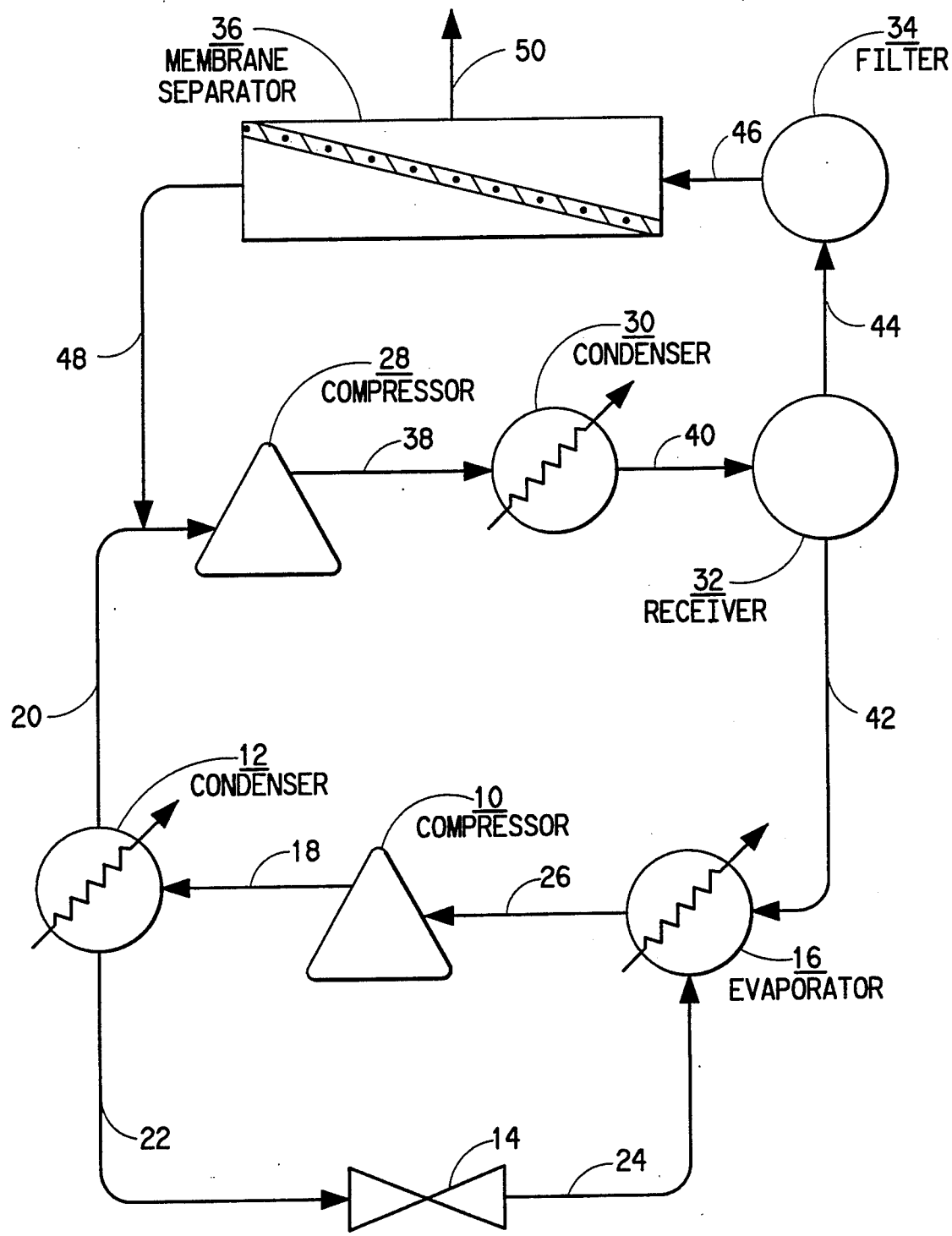
FIG. 1 represents a partial block diagram schematically illustrating a typical improved process and arrangement of equipment for eliminating non-condensible gas from a halocarbon vapor compression refrigeration system according to one specific embodiment of the present invention.
Figure 2:
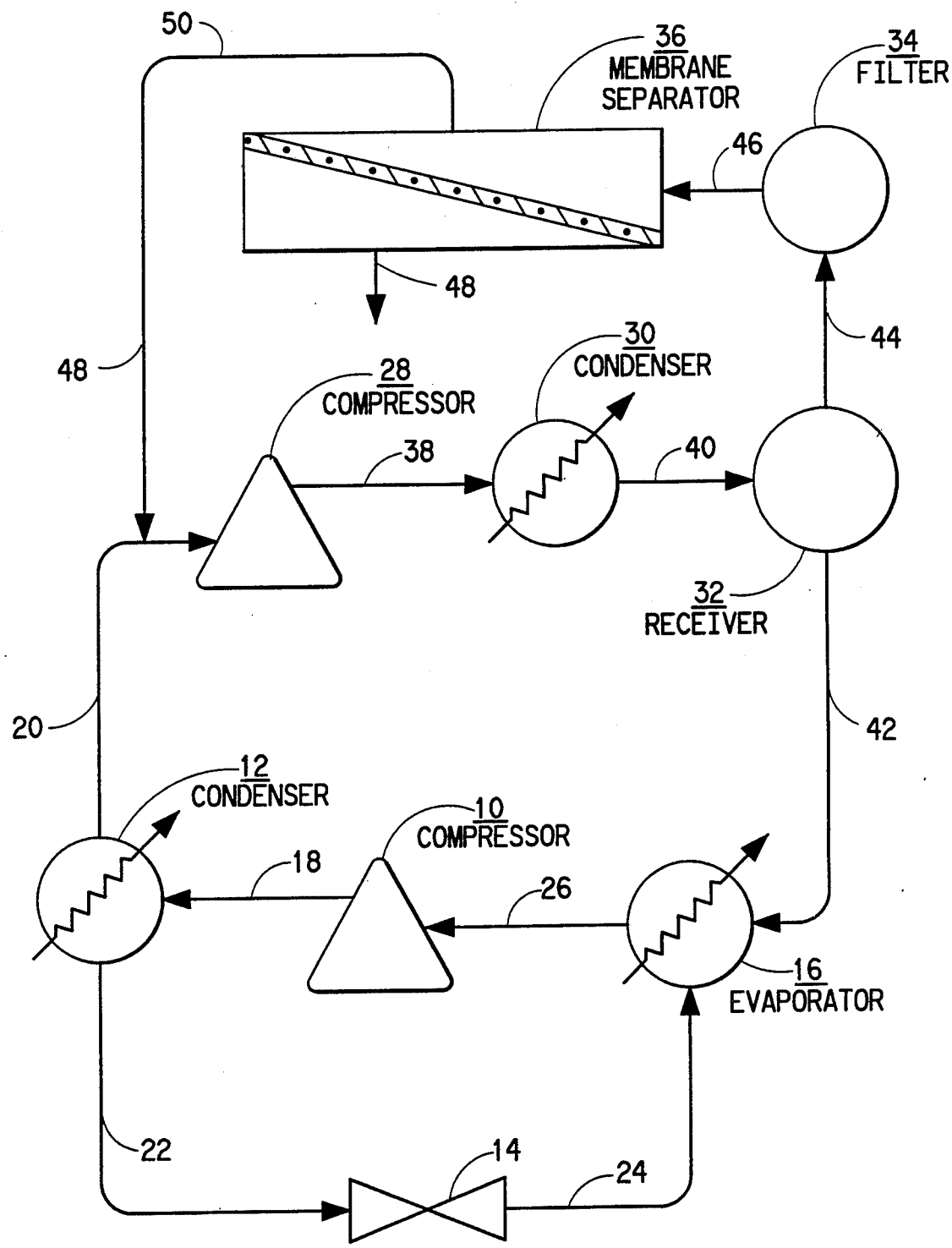
FIG. 2 represents a partial block diagram schematically illustrating another specific embodiment of the present invention.

In FIG. 1 a conventional hermetically sealed compressor unit 10, condenser/receiver 12, expansion valve 14 and evaporator 16 make up a primary refrigeration loop as generally known in the art. During operation a halocarbon refrigerant is continuously circulated from the high pressure outlet side of compressor 10, via line 18, to condenser 12 wherein heat energy is removed to produce a liquid phase halocarbon. In this particular illustrated embodiment a slip stream of vapor containing non-condensible gas contaminants and halocarbon vapor is continuously withdrawn from the condenser/receiver 12 via line 20. It is this particular feature of the present invention that represents a departure from the prior art processes. The predominantly liquid phase halocarbon refrigerant from the condenser 12 is then metered via line 22, through expansion valve 14 and via line 24 to the evaporator 16, again as generally known in the art. Within evaporator 16 the halocarbon, now at a lower pressure, evaporates and thus withdraws energy (cools) the heat exchange media passing through the other side of the evaporator coils. The vaporized halocarbon refrigerant then returns to the low pressure inlet side of compressor 10, via line 26, completing the primary refrigeration loop or cycle.

In describing the above primary refrigeration loop or cycle, it should be appreciated that various other apparatus and steps may be present and/or various pieces of equipment may be combined into a single unit. Thus, it is not uncommon to find receivers, driers, filters, accumulators, demisters or the like present or the condenser/receiver designed as a single integral unit (as illustrated in the Figures), all as generally known in the art. Also, the compressor can be a sealed motor/compressor combination and the expansion valve can be a fluid expansion valve or a capillary tube that serves both as a fluid expansion and metering device. Also, pressure regulator means and devices can be used at appropriate positions again to either control flow or pressure drop as generally exemplified later. As such, the present invention should not be viewed as being unduly limited by the specific embodiments illustrated in the drawings.

Typically during use of a conventional halocarbon vapor compression refrigeration system, the presence or introduction of any appreciable amount of non-condensible contaminant causes difficulties. Since in such a system there is no provision for the separation and removal of the non-condensible contaminant, the presence of the contaminant will reduce the efficiency of the overall halocarbon refrigeration cycle. For purposes of the present invention, the use of the phrase "non-condensible contaminant" means one or more of any material which, under the conditions existing during the normal operation of the halocarbon vapor compression refrigeration process wherein the halocarbon refrigerant is liquified by the actions of the compressor and the condenser, remains in the vapor state. Such non-condensible contaminants may include, by way of example but not limited thereto, nitrogen, oxygen, carbon monoxide, carbon dioxide, hydrogen halides as well as thermal decomposition products of halocarbons, lubricants, stabilizers or the like. As such, the presence of the non-condensible contaminant can be by virtue of failure to completely clean and evacuate the refrigeration system initially, introduction after the cleaning or evacuation as a contaminant of the halocarbon, lubricant or additives, in situ formation by degradation or side reaction or by leakage such as on the vacuum side of the compressor or across a seal and the like.

Again referring to FIG. 1, the improvement provided by the present invention involves a purge system comprising a second purge compressor 28, a purge condenser 30, a purge receiver 32, a filter 34, and a semipermeable membrane separator unit or means 36. During operation of this purge system according to the present invention, vapor phase removed from the upper portion of condenser/receiver 12 is delivered, vial line 20, to the inlet side of the purge compressor 28 and further compressed. This compressed vapor is then sent to the purge condenser 30, via line 38, for cooling and further condensing of the halocarbon. The effluent from condenser 30 is sent to the purge receiver 32, via line 40, for separation of the non-condensible gas from the liquid halocarbon. The liquid phase halocarbon is returned to the primary refrigeration loop, via line 42, and in this specific embodiment reintroduced and commingled with the liquid halocarbon on the low pressure side of the expansion valve prior to passing through the evaporator 16. It should be appreciated that additional valves or flow control can be present in line 42 (not shown) and/or the liquid hydrocarbon can be reintroduced (recycled) to other appropriate locations in the primary refrigeration loop. The vapor phase including the non-condensible contaminants over the liquid halocarbon in the purge receiver 32 is removed via line 44 and after passing through filter 34 is introduced to the feed side of semipermeable membrane separator unit 36 via line 46. In the specific embodiment of the present invention illustrated in FIG. 1, the semipermeable membrane being utilized is more permeable to the halocarbon vapor than to the non-condensible contaminant. Thus, the halocarbon enriched/non-condensible contaminant depleted permeate from unit 36 is removed via line 48 and sent to the low pressure (suction) side of the purge compressor 28. The non-condensible enriched/halocarbon depleted effluent exiting the unit 36 from the feed side of the membrane is permanently withdrawn from the refrigeration system via line 50 and is either vented or further processed depending on the nature and composition of the stream. In this manner and according to the present invention, the non-condensible contaminants and concentrated as feed side effluent of the semipermeable membrane unit and removed such as to restore and/or maintain the efficiency of the overall refrigeration cycle.

In essence, what the present apparatus and the process do is to take the vapor composition comprising non-condensible contaminant and halocarbon from the vapor space above the liquified refrigerant composition on the high pressure side of the refrigeration loop and then compress this vapor mixture to a substantially higher pressure via purge compressor 28 and liquify additional amounts of halocarbon in purge condenser 30 and pass the halocarbon depleted and non-condensible enriched composition to the semipermeable membrane separator to further separate the non-condensible contaminant from the halocarbon refrigerant. The liquified halocarbon depleted of non-condensible contaminant may be returned to the halocarbon vapor compression refrigeration system via line 42. If desired, the non-condensible enriched composition exiting via line 50 may be treated further for even more separation of the non-condensible contaminant from the halocarbon by treatment with additional perm-selective separation unit or by the adsorption of the halocarbon in an activated carbon adsorption tower. By the present process, the circulating halocarbon refrigerant in the halocarbon vapor compression refrigeration system will be purged of unwanted non-condensible contaminant, thus allowing the refrigeration system to operate at its maximum efficiency and the non-condensible contaminant released into the atmosphere will contain little or no halocarbon refrigerant for adverse environmental effects.

In another embodiment of the present invention, the semipermeable membrane used in the membrane separator is more permeable to the non-condensibles than to the halocarbons. Such an embodiment is illustrated in FIG. 2 wherein the difference between it and FIG. 1 is in the membrane separator unit 36 wherein the permeate exiting the system via line 48 to the atmosphere is enriched in non-condensible contaminant. The effluent from the feed side of the membrane separator is depleted of non-condensibles and is recycled via line 50 to the purge system compressor 28. As before, the halocarbon depleted stream may be treated further by semipermeable membrane separator or with activated carbon tower so that the gas which is released into the atmosphere will contain very little or no halocarbon for adverse environmental effects.

The semipermeable membrane separation unit useful in the present invention can be generally any such device as are well known in the art, including by way of example, but not limited thereto, semipermeable thin layer of film, spiral wound membrane, hollow fiber semipermeable membrane and the like. For the semipermeable membrane to separate the halocarbon/non-condensible vapor mixture into a halocarbon enriched component and a halocarbon depleted component, there must be a difference in the permeation rates for the halocarbon vapor and the non-condensibles (e.g., nitrogen and oxygen). For the purpose of this invention, the ratio of the permeation rates should be at least 4, preferably 10 or even higher with the actual permeability of the more permeable component typically at least $1 \times 10^{-10}$ cm$^3$(STP)cm·cm$^{-2}$·cmHg$^{-1}$·sec·$^{-1}$ or greater. Typically, the barrier membrane is an elastomeric polymer film from natural rubber, polyisoprenes, polybutenes, polybutadienes, silicone rubbers, neoprenes and the like as generally known in the art. For the separation of halocarbon from the non-condensibles, wherein the permeation selectivity is to favor passage of the halocarbons, a barrier membrane of dimethyl silicone rubber is preferred. On the other hand, when the permeation selectivity is to favor the passage of the non-condensibles the useful barrier membranes include glasses, ceramics, polymeric plastic films, natural products such as cellulose as well as porous metals or metal films such as stainless steels, palladium, platinum and cold rolled steel as generally known in the art.

The following example is presented to further illustrate quantitatively the results of employing the specific embodiment of the present invention illustrated in FIG. 1. In presenting this example, all references to percentages of components in the gaseous phase are by volume (mole) percent unless otherwise indicated.

EXAMPLE 1

In the operation of a refrigeration system wherein the refrigerant used is trichloromonofluoromethane (CCl$_3$F, CFC-11), the normal operating pressure in condenser 12 is about 24 psia at an operating temperature of about 100° F. (38° C.) when there is no non-condensibles present. As non-condensibles accumulate in the refrigeration system, the pressure in the condenser 12 (see Figures) will rise. If the pressure is allowed to rise to 30 psia. the vapor phase in the condenser will have a composition of 80 mole % CFC-11 and 20 mole % air (95 weight % CFC-11). Venting non-condensibles from the condenser at this point will result in a significant refrigerant loss (about 19 lbs. of CFC-11 per lb. of air vented). To reduce refrigerant losses, the vapor is taken via line 20 (see Figures) through a pressure regulator (not shown) to the purger compressor 28 where the vapor is compressed to about 100 psia and then cooled in the purge condenser 30 to a temperature of about 130° F. (54° C.). The liquified halocarbon depleted of non-condensible contaminates accumulates in purge receiver 32 and is then returned to the refrigeration system via line 42 through a pressure regulator (again not shown). The cooled vapor in the purge receiver 32 will have an approximate composition of 38.7 mole % CFC-11 and 61.3 mole % air (75.0 weight % CFC-11). This vapor is taken via line 44 through filter 34 and line 46 into a membrane separator module 36 utilizing elastomeric dimethyl silicone membrane which provides selective permeation of CFC-11. This separator can operate because the pressure on the permeate side is about 20–25 psia since it is in communication through a pressure regulator (also not shown) with the intake side of the purge compressor 28 and the feed side of the separator is at about 100 psia since it is in communication with the outlet side of the purge compressor 28. The permeate will have a composition of about 60 mole % CFC-11 and 40 mole % air (87.7 weight % CFC-11) at a pressure of about 25 psia and the residue gas exiting the separator via line 50 (see FIG. 1) and additional pressure regulator (not shown) to the atmosphere will have a composition of 6 mole % CFC-11 and 94 mole % air (23 weight % CFC-11) at about 100 psia. Venting non-condensibles with the improved purge system will result in a much reduced refrigerant loss (about 0.3 lbs. refrigerant/lb. of air vented). Thus, it can be seen that by comparing the vent stream composition from the improved purge system with the composition of the vapor exiting condenser 12 which would be the vent if the improved purge system were not present, the refrigerant losses are reduced by almost 18.7 lbs. refrigerant/lb. air vented (19−0.3=18.7) or a reduction of 98.5%.

As mentioned, the vapor exiting via line 50 may be treated further such as by additional perm-selective separation unit or active carbon adsorption such that non-condensibles discharged into the atmosphere will contain little or no CFC-11 for adverse environmental effects. The above-described reduction of the non-condensibles from CFC-11 is a result of a single pass of the vapor through the semipermeable membrane separator. As the permeate stream is recycled through the purge system, more and more of the non-condensibles will be separated and removed with each additional cycle.

Having thus described and exemplified the invention with a certain degree of particularity, it should be appreciated that the following claims are not to be so limited but are to be afforded a scope commensurate with the wording of each element of the claims and equivalents thereof.

We claim:

1. In a process wherein a halocarbon refrigerant is circulated, by use of a first compressor, from the high pressure outlet of the first compressor sequentially through a first condenser, a fluid expansion valve and an evaporator and then back to the low pressure inlet side of the compressor, the specific improvement comprising the steps of:
    (a) withdrawing at least a portion of the vapor phase present between the high pressure outlet of said first compressor and the high pressure side of said expansion valve means, wherein said vapor phase withdrawn contains non-condensible contaminants;
    (b) subjecting said vapor phase containing non-condensible contaminant of step (a) to a second compression to an even higher pressure;
    (c) passing the high pressure compressed vapor phase of step (b) through a second condenser to produce a condensed liquid phase halocarbon and a vapor phase enriched in non-condensible contaminant;
    (d) separating said liquid phase halocarbon produced in step (c) and returning said liquid phase halocarbon back to the liquid phase halocarbon refrigerant to be passed through an evaporator;
    (e) passing said vapor phase enriched in non-condensible contaminant produced in step (c) through a semipermeable membrane means to form a halocarbon enriched/non-condensible contaminant depleted first stream and a non-condensible contaminant enriched/halo-carbon depleted second stream;
    (f) recycling said halocarbon enriched/non-condensible contaminant depleted first stream produced in step (e) to the inlet side of said second compression step (b); and
    (g) removing said non-condensible contaminant enriched/halocarbon depleted second stream produced in step (e) from further circulation.

2. An improved process of claim 1 wherein said semipermeable membrane means produces a permeate enriched in halocarbon and depleted in non-condensible contaminant.

3. An improved process of claim 1 wherein said semipermeable membrane means produces a permeate enriched in non-condensible contaminant and depleted in halocarbon.

4. An improved process of claims 1, 2 or 3 wherein said separating of liquid phase halocarbon is performed by passing through a receiver and wherein said vapor phase enriched in non-condensible contaminant is passed through a filter before passing through said semipermeable membrane means.

5. In a halocarbon vapor compression refrigeration system wherein a primary compressor is used to circulate a halocarbon refrigerant from the high pressure outlet of said primary compressor sequentially through a primary condenser, a fluid expansion valve and an evaporator and then back to the low pressure inlet side of said primary compressor, the specific improvement comprising:
    (a) a second compressor in fluid communication with the vapor phase exiting said primary condenser before passing through said expansion valve;
    (b) a second condenser in fluid communication with the high pressure outlet side of said second compressor;
    (c) a receiver in fluid communication with the outlet of said second condenser;
    (d) a conduit means for returning condensed liquid phase halocarbon from said receiver back to said evaporator;
    (e) a semipermeable membrane separator means in fluid communication with the vapor phase of said receiver for separating said vapor phase from said receiver into a halocarbon enriched/non-condensible contaminant depleted stream and a non-condensible contaminant enriched/halocarbon depleted stream;
    (f) a conduit means to recycle said halocarbon enriched non-condensible contaminant depleted stream from said semipermeable membrane separator means to the inlet side of said second compressor; and (g) a means to vent said non-condensible contaminant enriched/halocarbon depleted stream from said semipermeable membrane separator means.

6. An improved halocarbon vapor compression refrigeration system of claim 5 wherein said semipermeable membrane separator means produces a permeate enriched in non-condensible contaminant and depleted in halocarbon.

7. An improved halocarbon vapor compression refrigeration system of claim 5 wherein said semipermeable membrane separator means produces a permeate enriched in halocarbon and depleted in non-condensible contaminant.

8. An improved halocarbon vapor compression refrigeration system of claims 5, 6 or 7 further comprising a filter means for purifying said vapor phase entering said semipermeable membrane separator means.

* * * * *